Feb. 17, 1931.  W. E. PHILIPS  1,793,190
IDLER ROLL
Filed June 8, 1928
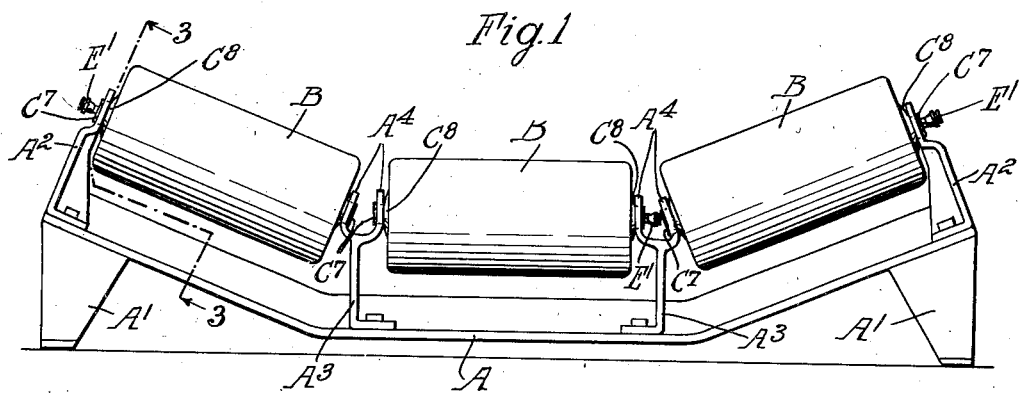
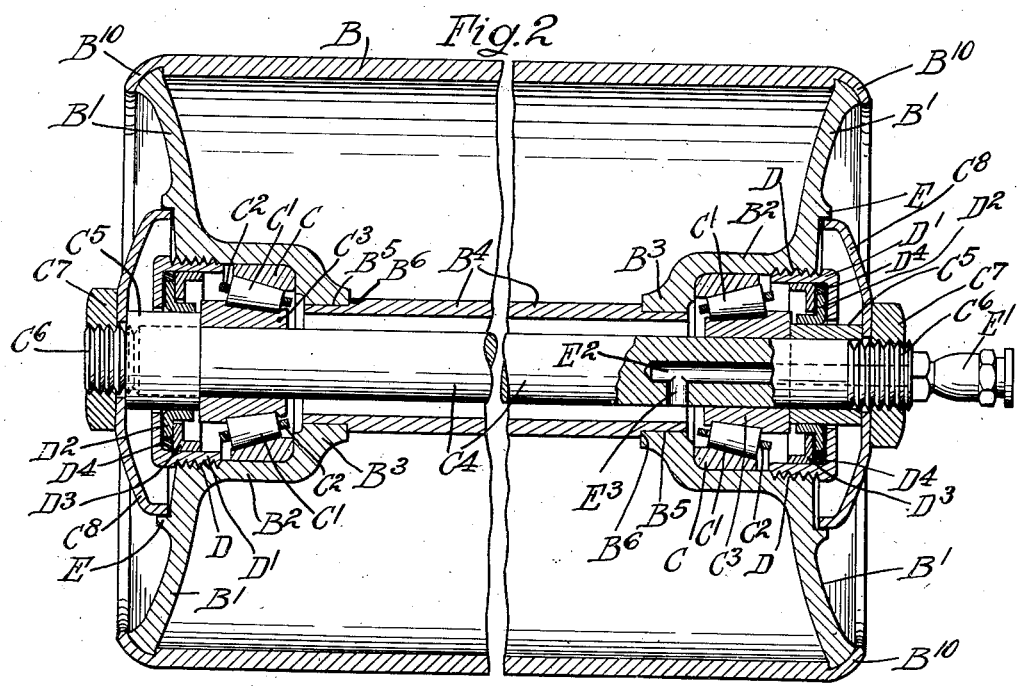
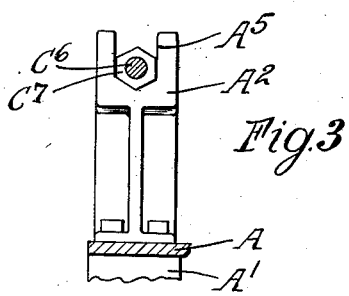
Inventor
William E. Philips
by Parker Carter
Attorneys Patented Feb. 17, 1931

1,793,190

UNITED STATES PATENT OFFICE

WILLIAM E. PHILIPS, OF CHICAGO, ILLINOIS, ASSIGNOR TO LINK-BELT COMPANY, OF CHICAGO, ILLINOIS, A CORPORATION OF ILLINOIS

IDLER ROLL

Application filed June 8, 1928. Serial No. 283,770.

My invention relates to improvements in bearings for idler rolls and has for one object to provide a bearing for idler rolls and the like of a type which will maintain an adequate supply of lubricant for the roll independent of position thereof and of a type which will effectually prevent the introduction of foreign substances such as water, dust and the like into the bearing areas. Another object of the invention is to provide a bearing which will be effectively lubricated and protected during long periods of operation. Another object is to provide a mechanical shield to prevent the introduction of foreign matter to the bearing. Another object is to provide a bearing wherein the lubricant is all effective and wherein no space is provided for the concentration of heavy masses of lubricant which might otherwise throw the roll out of balance. Other objects will appear from time to time throughout the specification and claims.

My invention is illustrated more or less diagrammatically in the accompanying drawings, wherein—

Figure 1 is a side elevation of a troughing idler;

Figure 2 is a longitudinal section through a roll embodying my invention;

Figure 3 is a section along the line 3—3 of Figure 1.

Like parts are indicated by like characters throughout the specification and drawings.

A is a bracket mounted on legs $A^1$ so that it may be held in place on any suitable support. From the bracket project upwardly a series of stands $A^2$ $A^3$. The central or interior stands $A^3$ are forked as indicated at $A^4$ and these forks and the ends of the stands $A^2$ are slotted as indicated at $A^5$ to hold the roll.

The roll is formed of a tubular element B having generally concaved ends $B^1$ secured to the ends of the roll B in any suitable fashion as for instance by upsetting or turning the extreme ends of the roll around the end plates as at $B^1$. The end plate has an exteriorly extending hollow cup $B^2$ inwardly flanged at $B^3$ to engage the sleeve $B^4$, there being thus a cup at each end of the sleeve. The sleeve is reduced to engage the flanges of the cup as indicated at $B^5$ and shouldered at $B^6$ so that the roll, the ends and the sleeve are held together as a unit.

Contained within the cup is an exterior roller bearing race C which engages the bottom of the cup. $C^1$ $C^1$ are rollers traveling along that race held in place by the usual catch $C^2$ and traveling upon an interior roller race $C^3$ which supports the shaft $C^4$. It will be noted that there is clearance between the shaft $C^4$ and the sleeve $B^4$ but that the clearance between them is comparatively small. $C^5$ $C^5$ are spacer sleeves on the opposed ends of the shaft $C^4$ engaging the races $C^3$. The ends of the shaft are threaded at $C^6$ and nuts $C^7$ threaded on the shaft hold the convex shields $C^8$ in position to overlie the central portion of the roll. The pressure of the nuts is transmitted through these shields to the sleeves $C^5$ and tend to force the inner races $C^3$ inwardly to bring them in proper working relation with the rolls $C^1$.

Each of the cups toward its outer ends is threaded at D and engaged by a threaded sleeve $D^1$ having a flange extending inwardly toward but out of contact with the sleeve $C^5$. $D^2$ is a flanged collar making a snug drive fit on the sleeve $C^5$ and extending out parallel with the flange of the sleeve $D^1$. $D^3$ is a flanged collar engaging the inside of the sleeve $D^1$ so positioned that the flange on the collar $D^1$ comes between the flange on the collar $D^3$ and the flange on the sleeve $D^1$. $D^4$ is a spacer ring held in place in the sleeve $D^1$ between the flanges $D^2$, $D^3$ and the flange of the sleeve $D^1$ so as to properly position the parts without interfering with the passage of lubricant.

It will be noted that the ends $B^1$ are flanged at E and that the outer inwardly turned edges of the shields $C^8$ fit within the flanges E being preferably just out of contact with the flanges and with the end, there being a running fit between the shield and the end $B^1$. $E^1$ is a grease gun fitting in the end of the shaft communicating with a longitudinal passage $E^2$ therein, which passage communicates in turn with a radial passage $E^3$ which discharges into the space between the shaft C⁴ and the sleeve B⁴. Lubricant may be introduced through this fitting and these channels to completely fill the space enclosed between the two shields, that is to say, if sufficient pressure is exerted the grease or lubricant will first fill the space between the sleeve and the shaft, then the bearing box contained within the two cups, then pass out through the labyrinthine channel formed by the sleeve D¹ D² and D³ and thence fill the space between the shields and the end of the shaft. It will be noted that such grease must pass through the labyrinth because the ring D² is tied on the sleeve C⁵ and the ring D³ is tied in the sleeve D¹. It will be noted also that there is a considerable space left between the outer ends of the anti-friction bearings and labyrinthine packing so that there is an appreciable mass of lubricant held on both sides of each of the bearings.

The use and operation of my invention are as follows:

Starting with the assembled roll comprising the outer cylindrical bearing surface, the two ends with their integral cups and the central sleeve, the device is preferably assembled in the shop by placing the anti-friction roller bearings, one in each cup, then inserting the shaft so that it is supported by the two inner roll races, then the spacer sleeves are threaded onto the shaft, the labyrinth rings are put in place and the threaded labyrinth sleeve is then screwed into the cup, it being of such dimensions that it does not engage the outer roll races and the packing labyrinth rings being of such dimension and position that only the interiorly flanged one engages the spacing sleeves. Then the two shields are put in place and the nuts are then threaded on the end of the shaft to exert such tension on the shaft as will tend to hold the anti-friction bearings in proper working position and hold the roll in proper position upon the shaft. It will be noted that the lengths of the threaded sections on the shaft are such that when in proper working position the threads on the shaft are just covered by the nuts and there are no projecting threaded shaft ends. This is of the utmost importance because only in this way can the threads be protected so as to prevent rusting and corrosion which might otherwise make it impossible to remove the nut when it is desired to renew the bearings. It will be noted that these two nuts are preferably lock nuts of any suitable type, preferably the distorted nut which can be screwed on and off but which requires a considerable force to accomplish such screwing. The result of this is that these nuts may be screwed up to proper position in the shop and the adjustment will remain correct during shipment and assembly of the roll as part of a belt conveyor idler.

When the roll is to be assembled as part of a belt conveyor idler, the roll unit is put in place on the supporting bracket. The stands on the bracket engage the nut and thereby hold the roll in position. This use of the nut as the engagement element of the roll with the bracket accomplishes two purposes. It insures that the bracket itself will prevent rotation of the nuts and thus makes accidental change of adjustment in operation impossible. It also because of the relatively large size of the nut gives a relatively wide supporting and bearing surface so that danger of vibrating loose is reduced to a minimum.

When the roll is in place the operator will force lubricant through the end of the shaft to completely fill the area contained between the two shields. There will thus be a supply of grease outside the bearing altogether between the labyrinth and the shield; a supply of grease inside the bearing between the big ends of the anti-friction rollers and the labyrinth and a supply of grease within the sleeve between it and the shaft adjacent the small ends of the anti-friction rolls.

The introduction of this grease by pressure from the inside tends to throw it outwardly toward and cause it to discharge from about the edges of the shield. Thus every time the grease is renewed the more or less spent and dirty grease from the space between the two labyrinths is forced outwardly into the place between the labyrinth and the shield carrying with it and extruding from between it and the roll any foreign matter which may perchance have penetrated inside the shield. This mass of grease between the labyrinth and the shield is an inert mass which never gets back to the bearings and always is present to serve as a guard and protection to prevent the introduction to the space behind the labyrinth of any foreign material. The shield itself extending out from behind the bearings catches and deflects any material which may drop toward the bearing and further protects this mass of inert protecting grease.

By this arrangement, there is a mass of lubricant on either side of the anti-friction bearing. No matter what the angle of inclination of the shaft, there is a mass of grease which may flow by gravity downward toward the working bearing. Under normal conditions, however, any flow of grease is always from the center of the roll outwardly toward the ends because the relatively small clearance between the roll and the shaft insures that when the roll is in operation the grease will be churned and stirred up and tend to flow out under centrifugal force against the inner wall of the sleeve and thence flow longitudinally toward the end of the bearings and experience shows that ordinarily there is some flow of grease from the inner portion of the grease containing area outwardly through the anti-friction rollers. Since the space between the sleeve and the shaft is very small any tendency of grease to settle to the bottom of the sleeve and congeal there when the roller is not operating will be negligible or if it takes place will be immediately overcome when the roll starts rotating, thus it is impossible for the roll to be thrown out of balance by a mass of cold congealed grease for any appreciable length of time.

I claim:

1. The combination with a rotating member of a housing formed therein, an anti-friction bearing located within the housing, a shaft extending through the housing upon which the bearing is mounted, a labyrinth grease seal interposed between the housing and the shaft, means for introducing grease under pressure into the housing, a deflector plate mounted on the shaft enclosing the seal and forming a closed chamber outside of the bearing adapted to be filled by lubricant forced through the seal from the interior of the housing.

2. The combination with a rotating member of a housing formed therein, an anti-friction bearing located within the housing, a shaft extending through the housing upon which the bearing is mounted, a labyrinth grease seal interposed between the housing and the shaft, means for introducing grease under pressure into the housing, a deflector plate mounted on the shaft enclosing the seal and forming a closed chamber outside of the bearing adapted to be filled by lubricant forced through the seal from the interior of the housing, the deflector plate inwardly flanged toward the rotating member, there being a flange on such member enclosing the periphery of the plate.

3. In combination a rotating member, a housing formed therein, an anti-friction bearing located within the housing, a shaft extending through the housing upon which the bearing is mounted, a sleeve slidable on the shaft engaging the inner race of the bearing, a grease seal interposed between the sleeve and the housing, the end of the shaft being threaded, a nut engaging the threaded end and adapted to force the sleeve inwardly to position the bearing on the shaft, a deflector plate located between the sleeve and the nut overlying the grease seal.

4. In combination a rotating member, a housing formed therein, an anti-friction bearing located within the housing, a shaft extending through the housing upon which the bearing is mounted, a sleeve slidable on the shaft engaging the inner race of the bearing, a grease seal interposed between the sleeve and the housing, the end of the shaft being threaded, a nut engaging the threaded end and adapted to force the sleeve inwardly to position the bearing on the shaft, a deflector plate located between the sleeve and the nut overlying the grease seal, the deflector plate comprising an inwardly flanged plate terminating adjacent the rotating member, the rotating member being flanged to overlie the periphery of the plate.

5. The combination with a rotating member of a housing formed therein, an anti-friction bearing in the housing, a shaft extending through the housing upon which the bearing is mounted, a labyrinth grease seal surrounding the shaft and closing the open end of the housing and a grease reservoir contained within the housing on each side of the anti-friction bearing.

6. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, a closure for the housing and a deflector plate overlying said closure and spaced therefrom and from the shell end to contain a supply of grease to fill the space and protect the closure.

7. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, adjusting sleeves slidable on each end of the shaft adapted to engage the inner races of the anti-friction bearings, the shaft being threaded, a nut on each end thereof adapted to force the adjusting sleeve inwardly to hold the bearings in proper adjustment.

8. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, adjusting sleeves slidable on each end of the shaft adapted to engage the inner races of the anti-friction bearings, a grease seal interposed between each adjusting sleeve and the housing to close it, a deflector plate at each end of the shaft, surrounding it, engaging the adjusting sleeve, overlying the grease seal and inwardly flanged toward the end.

9. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, adjusting sleeves slidable on each end of the shaft adapted to engage the inner races of the anti-friction bearings, a grease seal interposed between each adjusting sleeve and the housing to close it, a deflector plate at each end of the shaft, surrounding it, engaging the adjusting sleeve, overlying the grease seal and inwardly flanged toward the end, the end being outwardly flanged overlying the flange on the deflector plate.

10. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, adjusting sleeves slidable on each end of the shaft adapted to engage the inner races of the anti-friction bearings, a grease seal interposed between each adjusting sleeve and the housing to close it, a deflector plate at each end of the shaft, surrounding it, engaging the adjusting sleeve, overlying the grease seal and inwardly flanged toward the end, the end being outwardly flanged overlying the flange on the deflector plate, the ends of the shaft being threaded, a nut on each end adapted to force the adjusting sleeve inwardly to hold the bearings in proper adjustment with respect to the roll.

11. A roll for belts and the like comprising a cylindrical shell, dished ends closing the ends of the shell, centrally disposed inwardly extending housings carried by the dished ends, a cylindrical sleeve joining said housings, a shaft extending through said housings and sleeve, an anti-friction bearing in each housing mounted on the shaft, adjusting sleeves slidable on each end of the shaft adapted to engage the inner races of the anti-friction bearings, the shaft being threaded, a nut on each end thereof adapted to force the adjusting sleeve inwardly to hold the bearings in proper adjustment with respect to the roll, stands adapted to support the roll slotted to engage the nuts and hold them against rotation while supporting the roll.

Signed at Chicago, county of Cook and State of Illinois, this 16th day of May, 1928.

WILLIAM E. PHILIPS.